(12) United States Patent
Kusase et al.

(10) Patent No.: US 6,762,593 B2
(45) Date of Patent: Jul. 13, 2004

(54) ROTARY ELECTRIC MACHINE

(75) Inventors: Shin Kusase, Obu (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 10/079,431

(22) Filed: Feb. 22, 2002

(65) Prior Publication Data

US 2002/0117912 A1 Aug. 29, 2002

(30) Foreign Application Priority Data

Feb. 28, 2001 (JP) ........................................ 2001-055352

(51) Int. Cl.$^7$ ................................................ H20P 9/00
(52) U.S. Cl. ..................... 322/44; 310/68 C; 310/68 B; 310/184; 310/179
(58) Field of Search .......................... 310/179, 68, 184, 310/68 B, 68 C; 322/44

(56) References Cited

U.S. PATENT DOCUMENTS 4,103,217 A * 7/1978 Auinger et al. ............... 322/28
6,204,586 B1 * 3/2001 Umeda et al. ............... 310/179

* cited by examiner

Primary Examiner—Nicholas Ponomarenko
Assistant Examiner—Iraj A. Mohandesi
(74) Attorney, Agent, or Firm—Oliff & Berridge, PLC

(57) ABSTRACT

A rotary electric machine such as a vehicle AC generator includes a multi-phase armature winding, a stator core, a rotor including a magnetic field coil and a plurality of poles, an unbalance detecting coil, and a comparator circuit for comparing an output signal of the unbalance detecting circuit with a threshold value. If the AC generator fails, a voltage induced in the unbalanced detecting coil becomes larger than the threshold value, and an alarm is be outputted.

5 Claims, 5 Drawing Sheets

US 6,762,593 B2

ROTARY ELECTRIC MACHINE

CROSS REFERENCE TO RELATED APPLICATION

The present application is based on and claims priority from the following Japanese Patent Application: 2001–55352, filed Feb. 28, 2001, the contents of which are incorporated herein by reference.

BACKGROUND OF THE INVENTION

1. Field of the Invention

The present invention relates to a rotary electric machine, such as an AC generator, to be mounted in a passenger car or a truck or a generator-motor to be mounted in an electric vehicle or an industrial vehicle.

2. Description of the Related Art

As the rotary electric machine has become more powerful, compact and more accurate, it has unlimitedly come to use in industry and social life system. Accordingly, it has become very important for safety and life to detect a failure of the rotary electric machine so that a user can cope with the failure before an accident. For this purpose, it is necessary to provide an inexpensive, highly efficient and reliable failure detection device or system. In particular, the energy of the power system of the rotary electric machine (e.g. input side of a motor or output side of a generator) is so large that the failure may cause a terrible disaster, such as a fire. In order to prevent such a failure, the following arrangements of detecting the operation condition of the rotary electric machine have been proposed: a thermistor is inserted into a stator winding to detect abnormal temperature caused by a failure of the winding; and current transformers (CT) are respectively inserted into phase-windings of the three-phase stator winding to measure a current composite vector or difference vector so as to detect leakage of electricity or short circuit.

However, it is difficult to insert such a thermistor into the stator winding in an automatic winding process of the rotary electric machine. In addition, it is difficult to eliminate a big difference in reliability between the rotary electric machines. On the other hand, it becomes expensive to employ the current transformers in the rotary electric machine.

SUMMARY OF THE INVENTION

Therefore, a main object of the invention is to provide a reliable and inexpensive rotary electric machine whose failure can be surely detected.

According to a feature of the invention, a vehicle AC generator includes a multi-phase armature, a rotor, first means disposed in the armature for generating an output signal according to a balance condition of magnetic field of the armature winding and second means for judging whether the armature fails or not by comparing the output signal with a threshold value. Preferably, the first means includes an unbalance detection coil disposed in a portion of the armature where the unbalance detection coil is magnetically more influenced by a composite magnetic field caused by unbalance of current values of the multi-phase armature than a composite magnetic field of at least one of the rotor and the armature. The second means may be comprised of an alarm circuit for outputting alarm if the output signal of the first means becomes larger than the threshold value.

It is also preferable that the unbalance detection coil has a winding pitch that is equal to the quotient of the pole pitch divided by an odd number and is an even number of times as long as the winding pitch. The unbalance detection coil may be disposed in parallel with the stator core along coil ends of the armature winding.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator 1 according to a first embodiment of the invention is described with reference to FIGS. 1–5.

Figure 1:
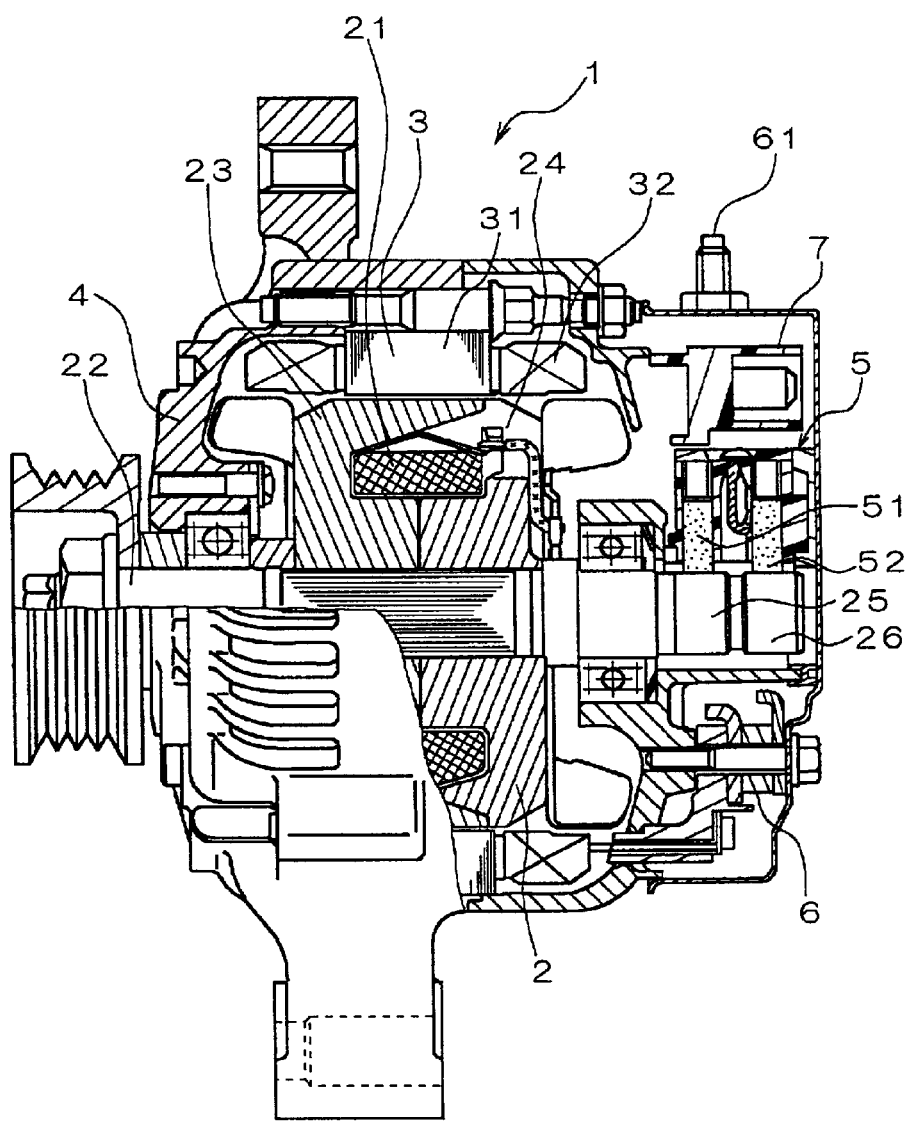
FIG. 1 is a cross-sectional side view of a vehicle AC generator according to a first embodiment of the invention.
Figure 2:
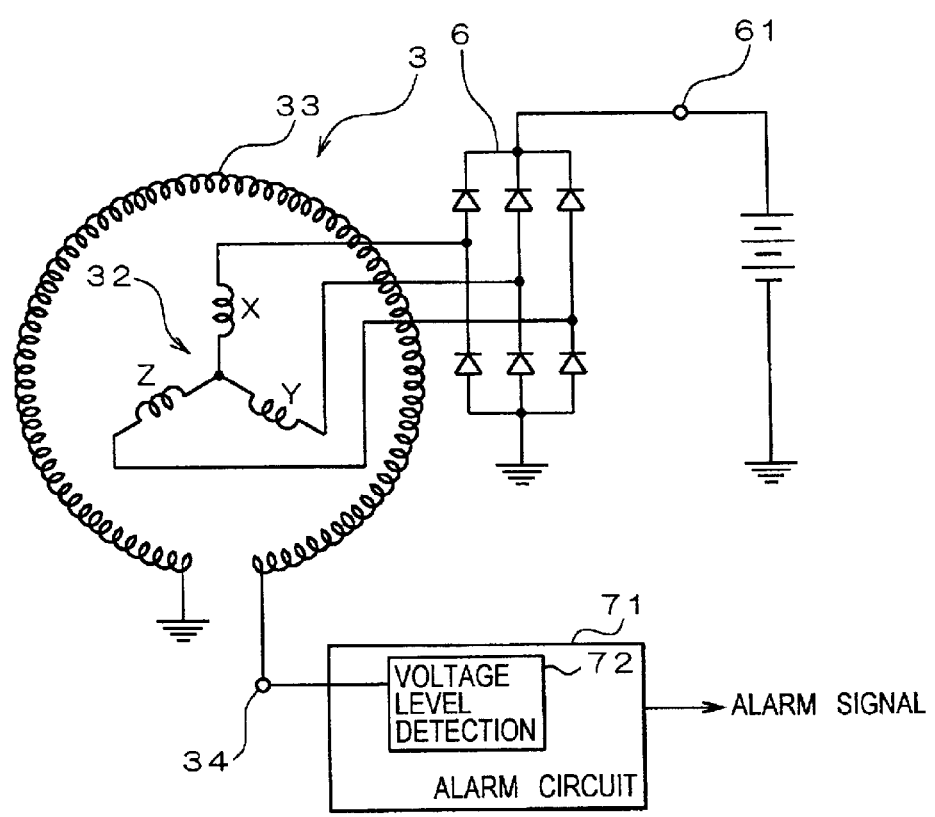
FIG. 2 is a circuit diagram of the vehicle AC generator shown in FIG. 1.

As shown in FIGS. 1 and 2, the vehicle AC generator 1 includes a rotor 2, an armature 3, a frame 4, a brush unit 5 and a rectifier unit 7.

The rotor 2 is comprised of a cylindrically wound field coil 21, a rotary shaft 22, a pair of pole cores 23 and 24 and a pair of slip rings 25 and 26 fixed to a portion of the shaft away from a pulley. The field coil 21 is supplied with exciting current via the pair of slip rings 25 and 26. The pair of pole cores 23 and 24 is fixed to the rotary shaft 22 and encloses the field coil 21 along the rotary shaft 22.

The armature 3 is comprised of a stator core 31 having a plurality of slots and a three-phase armature winding 32 that is mounted in the plurality of slots. The armature winding 32 is comprised of X phase-winding, Y phase-winding and Z phase-winding, which have one ends being connected together to form a neutral point.

Figure 3:
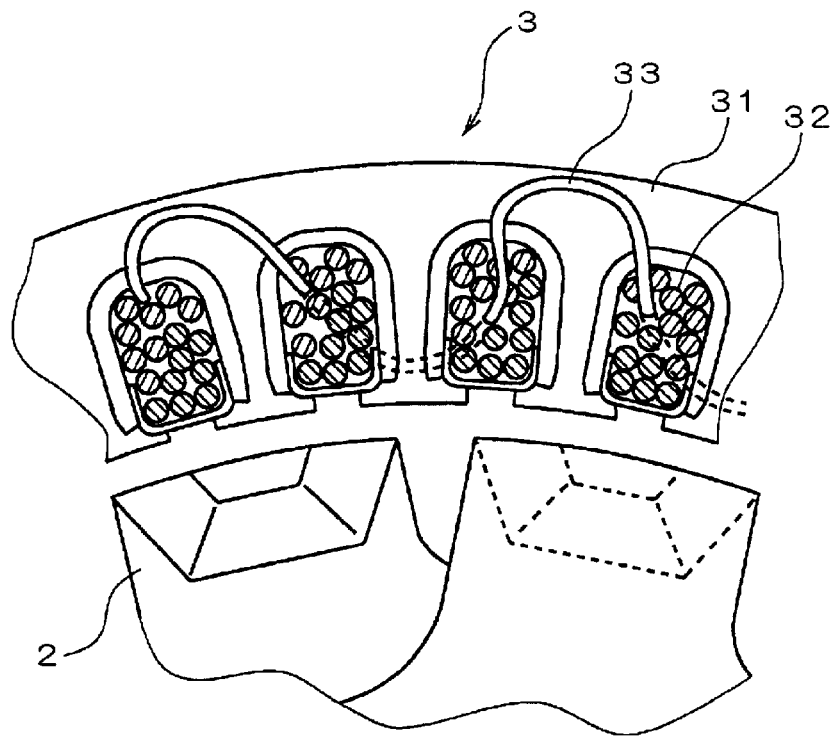
FIG. 3 is a fragmentary schematic view of an armature with an unbalance detection coil and a rotor.
Figure 4:
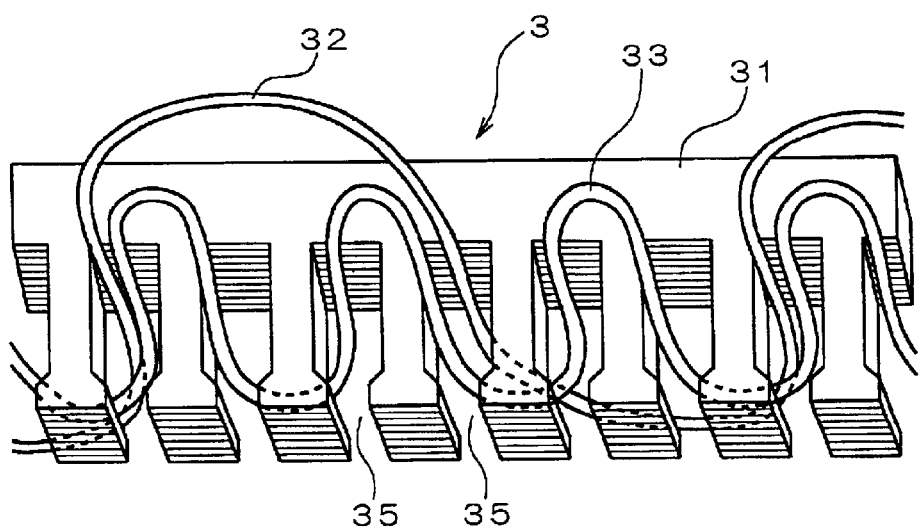
FIG. 4 is a fragmentary schematic perspective view of the stator with the unbalance detection coil.

The armature 3 includes a unbalance detection coil 33 besides the armature winding 32. The unbalance detection coil 33 is a coil of several-turn (e.g. 10) that is inserted zigzag into every one of the slots of the stator core 31, as shown in FIGS. 3 and 4. The armature winding 32 is comprises of a plurality of coils inserted zigzag into every third slot. That is, a pole pitch corresponds to three slot-pitches.

When the vehicle AC generator 1 operate normally, three-phase AC voltage having symmetric wave forms is generated. Accordingly, the composite vector of basic magnetic flux that interlinks the unbalance detection coil 33 is approximately zero. Therefore, no electromotive force appears at an output terminal 34 of the unbalance detection coil 33 except for voltage caused by the third high-frequency component having a half wave-length of 60° that corresponds to a third of the pole pitch. On the other hand, if a failure occurs, the composite vector of the basic magnetic flux interlinking the unbalance detection coil 33 is not balanced, and a significantly large electromotive force appears at the output terminal 34.

In the meanwhile, the unbalance detection coil 33 has a winding pitch that is equal to the quotient of the pole pitch (in this case 3 slot-pitches) divided by an odd number (e.g. 3) and is an even number of times as long as the winding pitch. Thus, the composite vector becomes zero because of a completely symmetric magnetic flux wave at normal operation, while the composite vector appears if a failure occurs.

The frame 4 accommodates and supports the rotor 2 and the armature 3 so that the rotor 2 can rotate about the rotary shaft 21 within the armature 3. The brush unit 5 includes a pair of brushes 51 and 52 in contact with the pair of slip rings 25 and 26 through which the exciting current is supplied to the field coil 21.

The rectifier unit 6 is comprised of a three-phase full-wave rectifying circuit that converts AC power induced in the armature winding 32 into DC power. The rectifier unit 6 includes three negative-side diodes having anodes connected together and three positive-side diodes having cathodes connected together. The cathodes of the positive-side diodes are connected to output terminals 61.

The voltage regulator 7 regulates the output voltage of the vehicle AC generator 1 by controlling the exciting current supplied to the field coil 21. The voltage regulator 7 includes an alarm circuit 71. The alarm circuit 71 includes a voltage level detection circuit 72 that compares a DC voltage level, which is a rectified voltage of the output terminal 34 of the unbalance detection coil 33, with a threshold voltage. If the DC voltage level is higher than the threshold voltage, the alarm circuit 71 outputs an alarm signal.

Figure 5:
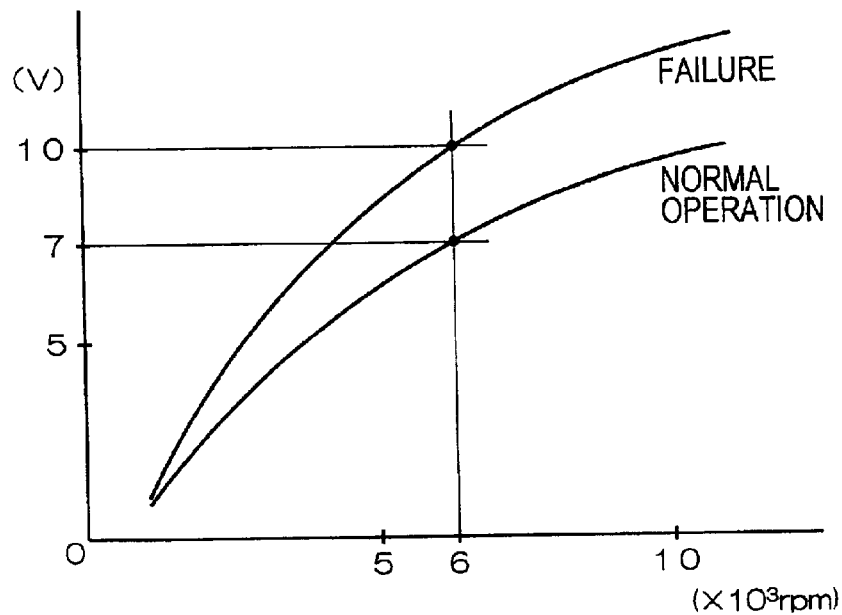
FIG. 5 is a graph comparing output voltage of the unbalance detection coil in normal operation of the vehicle AC generator with the output voltage of the unbalance detection coil in failure thereof.

As shown in FIG. 5, the unbalance detection coil 33 generates the output voltage of 7 volts at 6000 rpm when the vehicle AC generator 1 is in the normal condition, while it generates 10 volts if it is in failure. Thus, a failure of the vehicle AC generator 1 can be detected easily if the threshold level is set to a value between 7 and 10 (e.g. 8.5 volts). Because the rotation speed of the vehicle AC generator 1 varies widely as the rotation speed of the vehicle engine varies, it is preferable to provide a plurality of threshold values that correspond to a plurality of the rotation speeds of vehicle AC generator 1.

Figure 6:
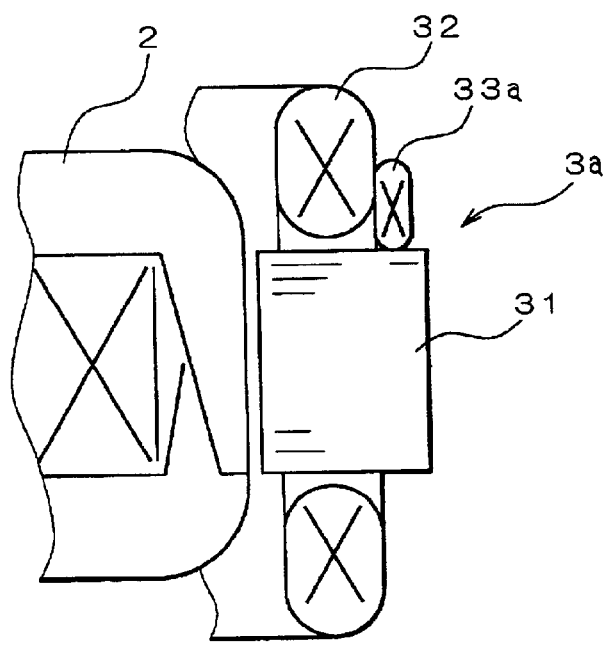
FIG. 6 is a schematic fragmentary diagram of a vehicle AC generator according to a second embodiment of the invention.
Figure 7:
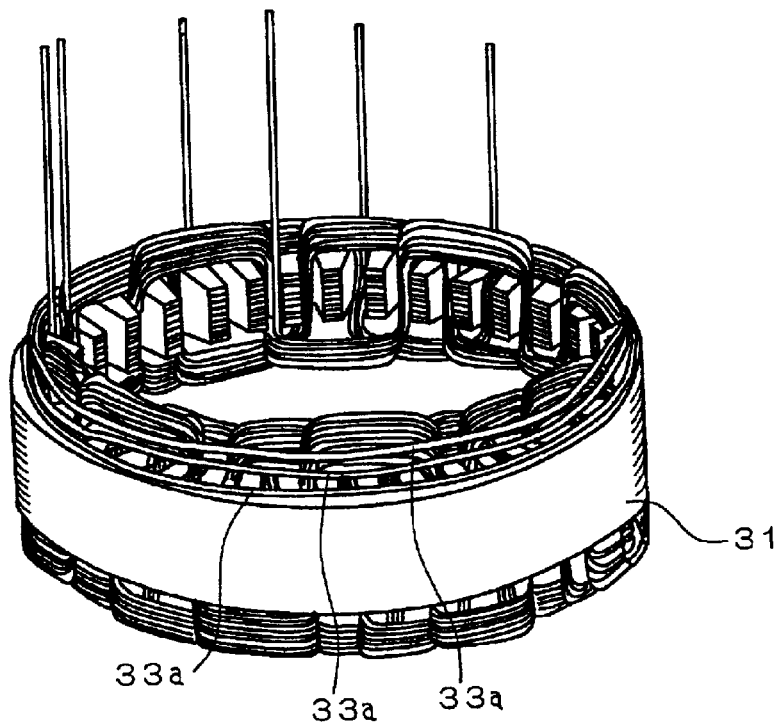
FIG. 7 is a perspective view of a stator of the vehicle AC generator according to the second embodiment.

A vehicle AC generator 1a according to a second embodiment of the invention is described with reference to FIGS. 6–8. In the meantime, the same reference numeral corresponds to the same or substantially the same part, portion or component as the vehicle AC generator 1 according to the first embodiment.

An unbalance detection coil 33a is disposed near the stator core 31 of an armature 3a and the rotor 2 and wound along the coil ends of the armature winding to be in parallel to the stator core 31 and perpendicular to the rotary shaft of the rotor 2. Therefore, the unbalance detection coil 33a is disposed under a balanced rotating magnetic field when the vehicle AC generator 1a is in a normal operation condition. In this condition, no voltage due to high frequency components is induced in the unbalance detection coil 33a. If a failure occurs in the vehicle AC generator 1a, an unbalance armature reaction is caused by the armature 3a. Accordingly, an unbalance condition is caused by a difference between the magnetic field of the rotor 2 and the armature reaction, and an output voltage due to the unbalance condition is induced in the unbalance detection coil 33a, as shown in FIG. 8.

Figure 8:
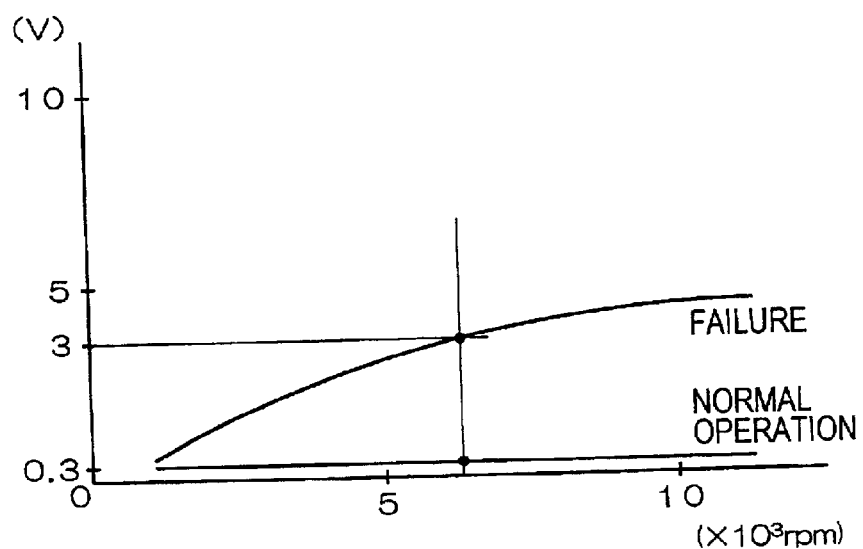
FIG. 8 is a graph comparing output voltage of an unbalance detection coil in normal operation of the vehicle AC generator with the output voltage of the unbalance detection coil in failure operation thereof.

As shown in FIG. 8, the output voltage of the unbalance detection coil 33a is 0.3 V whenever the vehicle AC generator 1a operates normally, while the output voltage increases as the rotation speed increases if it fails. For example, the output voltage is 3V at 6000 rpm when it operates in a failure condition. Therefore, the SN ratio of the unbalance detection coil 33a is 10 (3/0.3), so that the failure can be detected easily if the threshold level of the voltage level detection circuit 72 is set to a value between 0.3 v and 3 V (e.g. 1.5 V).

The unbalance detection coil 33 or 33a can be disposed at any portion of the vehicle AC generator 1 or 1a if it is magnetically more influenced by a composite magnetic field caused by unbalance of current values of multi-phase windings than a composite magnetic field of at least one of the rotor 2 and the armature 3. For example, the unbalance detection coil 33a can be disposed along the opposite side of the armature winding shown in FIG. 6.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine comprising:
    an armature including a stator core having a plurality of slots and a multi-phase armature winding, phase windings of which are disposed in said slots symmetrically with each other to normally generated magnetic flux balancing with each other;
    a rotor including a magnetic filed coil and a plurality of poles disposed circumferentially at certain pole pitches;
    first means, disposed in said armature, for generating an output signal if the magnetic flux generated by said armature winding becomes unbalanced; and
    second means for detecting abnormality of said rotary electric machine if said output signal exceeds a preset threshold value.

2. The rotary electric machine as claimed in claim 1, wherein
    said first means comprises an unbalance detection coil disposed in a portion of said armature where said coil is magnetically more influenced by a composite magnetic field caused when said multi-phase armature winding becomes unbalanced than by a composite magnetic field of at least one of said rotor and said armature.

3. The rotary electric machine as claimed in claim 2, said unbalance detection coil has a winding pitch that is equal to the quotient of said pole pitch divided by an odd number and is an even number of times as long as the winding pitch.

4. The rotary electric machine as claimed in claim 2, wherein
    said unbalance detection coil is disposed in parallel with said stator core along coil ends of said armature winding.

5. The rotary electric machine as claimed in claim 1, wherein
    said second means comprises an alarm circuit for outputting alarm if said output signal of said first means becomes larger than said threshold value.

* * * * *